(12) United States Patent
Gauss

(10) Patent No.: US 7,506,923 B1
(45) Date of Patent: Mar. 24, 2009

(54) ADJUSTABLE BI-FOLD TRAY TABLE

(75) Inventor: Jason A. Gauss, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 12/100,702

(22) Filed: Apr. 10, 2008

(51) Int. Cl.
A47B 83/02 (2006.01)

(52) U.S. Cl. .................. 297/150; 297/149; 297/154

(58) Field of Classification Search ........... 297/149, 297/148, 154, 155, 150, 151, 160, 161, 162, 297/173; 108/50.11, 44, 5, 6, 167, 171
See application file for complete search history.

(56) References Cited

U.S. PATENT DOCUMENTS

| | | | |
|---|---|---|---|
| 3,999,798 A * | 12/1976 | Roulier | 297/150 |
| 4,779,884 A * | 10/1988 | Minati | 280/304.1 |
| 4,852,940 A | 8/1989 | Kanigowski | |
| 5,169,209 A | 12/1992 | Beroth | |
| 5,269,229 A | 12/1993 | Akapatangkul | |
| 5,547,247 A * | 8/1996 | Dixon | 297/145 |
| 6,431,645 B2 | 8/2002 | Massara et al. | |
| 6,454,349 B1 | 9/2002 | Konya | |
| 6,550,861 B1 | 4/2003 | Williamson | |
| 6,761,398 B2 | 7/2004 | Bentley et al. | |
| 6,792,875 B2 | 9/2004 | Williamson et al. | |
| 6,827,026 B2 | 12/2004 | Williamson et al. | |
| 7,004,430 B2 | 2/2006 | Weekly | |
| 7,073,449 B2 | 7/2006 | Pipkin | |
| 7,261,369 B2 | 8/2007 | Ahad | |

* cited by examiner

Primary Examiner—Milton Nelson, Jr.
(74) Attorney, Agent, or Firm—Adams Intellectual Property Law, P.A.

(57) ABSTRACT

An adjustable tray table assembly for a vehicle seat including a bi-fold tray table, an adjustment assembly for adjusting the tray table in the fore/aft and lateral directions, a support arm for supporting the tray table and slidably receiving the adjustment assembly, and an attachment arm interconnected with the support arm for attaching the tray table assembly to the vehicle seat. The adjustment assembly includes a guide bracket that slides both within an elongated opening of the support arm and along at least one guide attached to the tray table to provide the adjustability.

15 Claims, 6 Drawing Sheets

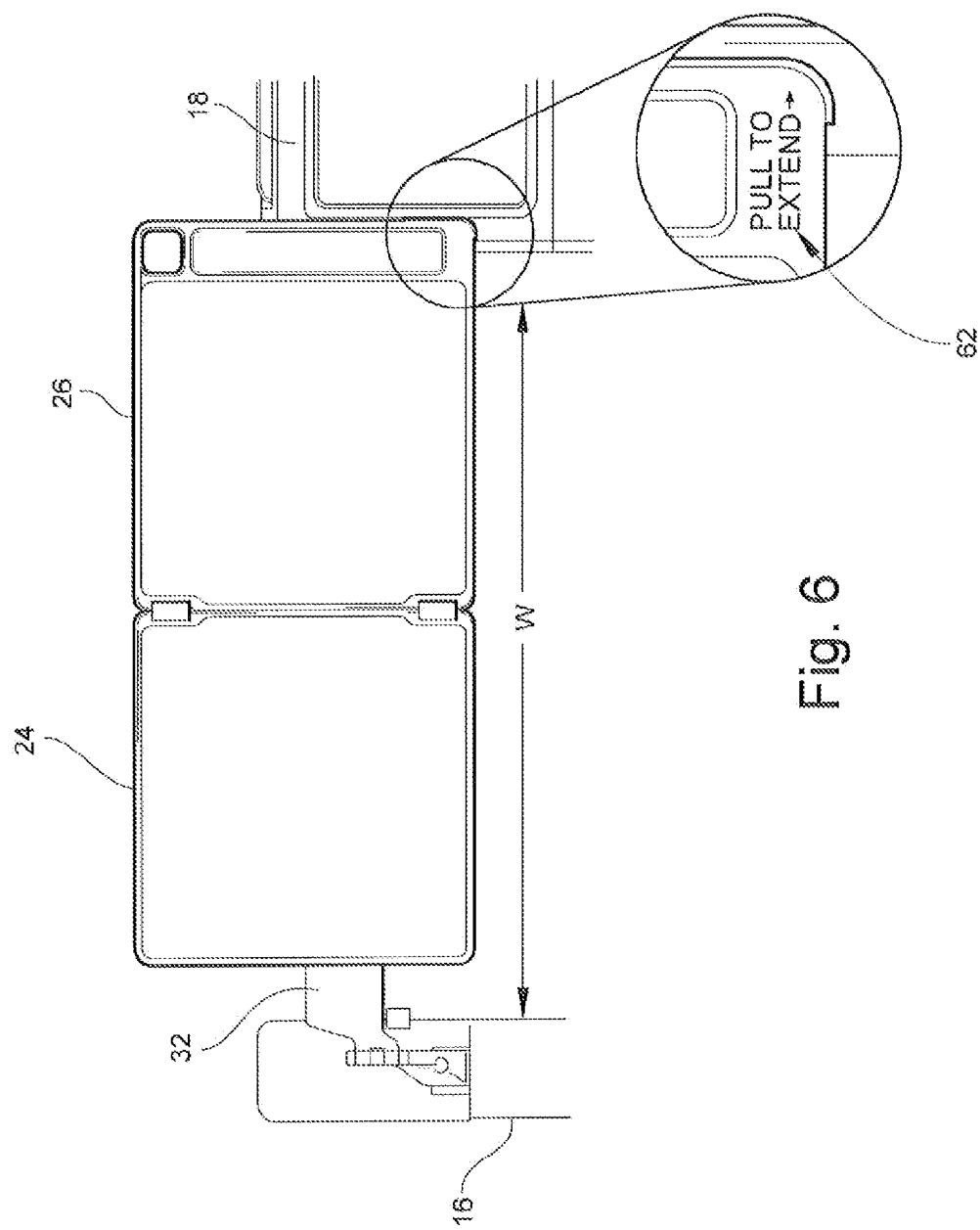

ADJUSTABLE BI-FOLD TRAY TABLE

TECHNICAL FIELD AND BACKGROUND OF THE INVENTION

1. Field of the Invention

The present invention relates generally to a passenger vehicle tray table, and more specifically, to an adjustable bi-fold tray table for a passenger seat that is selectively movable in the fore, aft and lateral directions for maximum adjustability.

2. Description of the Related Art

Passengers seats, such as those found on an aircraft, typically include a seat frame securely mounted to the vehicle floor, a passenger supporting portion including a seat back and a seat bottom mounted to the frame, and a pair of armrests positioned about the sides of the seat bottom. While several functions of the armrests are to provide passenger comfort and define the living space of the seat, the armrests commonly function as mounting surfaces for seat controls, media controls, headphone jacks, attendant calling controls, as well as defining storage compartments and beverage holders.

Vehicle passenger seats are typically arranged in rows of predetermined numbers of seats to accommodate a predetermined number of passengers. Groups of rows of seats may be separated into "classes" of seats, such as "first class," "business class," and "coach class" seating, for example. First class seats typically provide the greatest amount of living space, seat comfort and seat adjustability. Rows of coach seats are typically positioned in close enough proximity that the tray table for a passenger in a coach seat is mounted to the back of the seat immediately in front of the passenger. In arrangements in which the coach seat is in the first row of seats, the tray table is typically stowed alongside the seat frame and swung into position as needed. In the case of a tray table attached to a seat back, the tray table includes a single tray mounted to a pair hinges that allow the tray table to be moved between a stowed position flush against the seat back and a working position. Once in the working position, the tray table is not capable of being moved in the lateral or "cross-craft" direction and remains laterally fixed between the hinges. First class and business class seats, because of the larger amount of living space and greater distance between rows, typically locate their tray tables within an end-bay defined within an armrest of the seat.

Conventional tray tables stowed within the end-bay are typically attached to the seat through a complex hinge adapted to allow the tray table to rotate, pivot and fold flat across the lap of the passenger. To access the tray table from the end-bay, the passenger typically rotates opens a portion of the armrest and withdraws the tray table by rotating it outwards about 180 degrees. The tray table is then folded flat in front of the passenger to provide a generally flat working surface. The packaging restraints of the end-bay limit the dimensions of the tray table, thus a fully withdrawn and positioned tray table has a length insufficient to bridge the gap between the armrests of a large seat, such as a first class seat. Since the tray table is only supported at its hinge end, the tray table is unstable and can suffer from an undesirable "diving board" effect.

Accordingly, what is desired is a tray table capable of bridging the gap between the armrests of its attached seat, while having a design that allows the tray table to be folded and stored when not in use, such as within an end-bay of the seat. Still further, what is desired is a tray table that provides a passenger the maximum amount of adjustability of the tray table when positioned to provide maximum support and comfort.

SUMMARY OF THE INVENTION

In one aspect, the present invention provides an adjustable tray table for a vehicle passenger seat.

In another aspect, the present invention provides a bi-fold tray table capable of being stored in a passenger seat end-bay or alongside the seat when not in use.

In yet another aspect, the present invention provides an adjustable, bi-fold tray table for a luxury class passenger seat.

In yet another aspect, the present invention provides a foldable tray table for a passenger seat that is adjustable in the fore/aft and lateral (i.e., cross-craft) directions.

In yet another aspect, the present invention provides an adjustable, bi-fold tray table adapted to bridge the gap between the seat armrests so that the tray table is supported at both of its ends.

To achieve the foregoing and other aspects and advantages, and in accordance with the purposes of the invention as embodied and broadly described herein, the present invention provides an adjustable, bi-fold tray table for a vehicle passenger seat. In one embodiment, the tray table includes a first tray table portion and a second tray table portion interconnected through a hinge that allows the tray table to fold upon itself to satisfy packaging restraints in the end-bay or alongside the seat. At least one of the first and second tray table portions includes a mechanical stop for limiting the rotation between the first and second portions. The tray table is movably interconnected with a tray table support arm through an adjustment assembly. The tray table support arm is connected to the seat, armrest, seat frame, end-bay, or any other seat supporting structure through a seat attachment arm. The seat attachment arms pivots and rotates at its first end relative to the seat supporting structure. The tray table support arm and second end of the attachment arm are connected together through a hinge that allows the tray table to be moved between a vertical position (i.e., partially installed) and a horizontal position (i.e., in use position).

The adjustment assembly includes at least one guide attached to the first tray table portion along which a guide bracket slides to provide fore and aft movement of the tray table relative to the fixed tray table support arm. The support arm is "fixed" in the sense that it does not move once positioned in the "in use" position. The guide bracket is further slidably received within an elongated opening defined by the tray table support arm, which allows the bracket, and in turn the tray table, to move laterally across the seat with respect to the "fixed" tray table support arm. Thus, the adjustment assembly provides selective fore, aft and lateral movement of the tray table for maximum adjustability.

In another embodiment, the present invention provides an adjustable, bi-fold tray table assembly and attachment arm for attaching the tray table assembly to seat structure. The attachment arm is configured to allow the assembly to be moved between a stowed position and an in use position. The tray table assembly includes first and second tray portions hinged together to permit the support tray to be folded upon itself, thus increasing/decreasing the supporting surface of the tray table. At least one of the tray portions includes a mechanical stop that prevents the second tray portion from being rotated more than about 180 degrees relative to the first tray portion, thus together providing a generally planar supporting/working surface. The mechanical stop may alternatively be provided in the hinge connecting the first and second tray portions. The tray table assembly further includes an adjustment assembly for adjusting the position of the first and second trays in the fore, aft and lateral directions relative to a tray table support arm.

The adjustment assembly includes a pair of guide rods mounted to the bottom surface of the first tray portion. A guide bracket slidingly receives the rods through openings defined in the guide bracket. The pair of rods allow the tray table to slide fore and aft relative to the fixed tray table arm while preventing twisting of the tray table. The guide bracket is slidably received within a lateral, elongate opening defined in the fixed tray table support arm. The opening preferably ranges in length from about 1 to about 12 inches, more preferably around 6 inches in length. This provides for about 1 to about 12 inches of travel for the tray table, preferably about 6 inches of travel. By providing a tray table that can unfold to increase the surface area, and providing lateral movement of the tray table, the tray table is able to bridge the gap between armrests of the seat, thus supporting the tray table at both ends. The tray table is supported at the first end by the tray table support arm through the adjustment assembly, and at the second end by the seat armrest.

Additional features and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which:

FIG. 6 is a top view of the tray table shown in the unfolded configuration and laterally extended.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The present invention provides a tray table for a vehicle passenger seat that is adjustable in the fore/aft and lateral directions to provide maximum tray table adjustability for the seat occupant. The tray table is further laterally extendable to bridge the gap, when unfolded, between armrests of the passenger seat so that the tray table is supported at both ends, the first end ultimately by the seat attachment arm, and the second end by the seat armrest opposite the tray table storage side of the seat. The seat attachment arm and tray table support arm are preferably made from a lightweight and durable material, such as aluminum or other material. The tray table portions are preferably durable, molded articles made from polyethylene or like materials.

Figure 1:
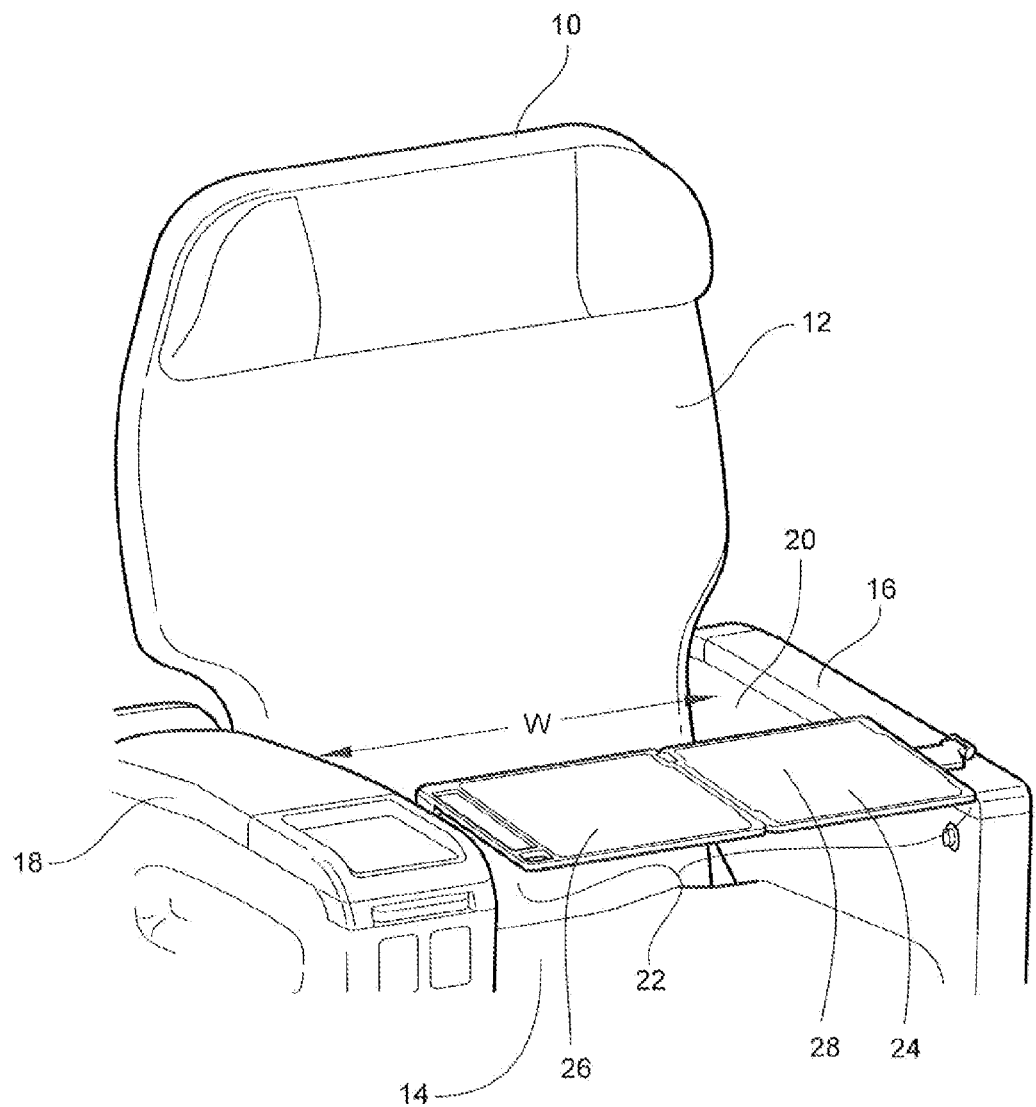
FIG. 1 is a perspective view of a vehicle passenger seat showing the tray table in its in use configuration and not laterally extended.

Referring to FIG. 1, a vehicle passenger seat including an adjustable, bi-fold tray table is shown generally at 10. The seat 10 includes seat back 12 and seat bottom 14 portions mounted to a frame. The frame may be securely mounted to the floor of the vehicle to prevent movement. The seat 10 further includes first and second armrests 16 and 18 positioned about either side of the seat bottom 14. Armrests function to provide passenger comfort as well as serve as mounting surfaces for passenger controls, such as seat recline controls, media controls and attendant call controls, as well as others. As shown, the second armrest 18 further functions as a console. The first armrest 16 defines an end-bay 20 within in which the adjustable, bi-fold tray table of the present invention may be stowed between uses. Although not shown, it is commonly known to store a tray table within an end-bay of an armrest, and to withdraw the tray table by opening a portion of the armrest and rotating the tray table outward. An end-bay may be defined in either one or both of the armrests. In an alternative embodiment, the tray table may be stored alongside the seat and exposed.

The seat 10 shown is a luxury seat, such as one found in a first class or business class seating section of an aircraft. Luxury seats typically include a larger living space than economy class seating. The width of the seat between first and second armrests 16 and 18 is shown at w. The seat may also be an economy class seat, such a seat in the first row of the economy class section or a seat in an exit row. The tray table assembly 22 is shown rotated out of the end-bay 20 and folded flat across the seat. The tray table 22 includes first and second tray portions 24 and 26 that provide a generally flat working or supporting surface 28 for supporting a laptop, meal tray, beverage or other item. As shown, the tray table assembly 22 is in the unfolded and in use configuration, however, is not shown extended so as to bridge the gap w between armrests 16 and 18, as will be described in more detail below.

Figure 2:
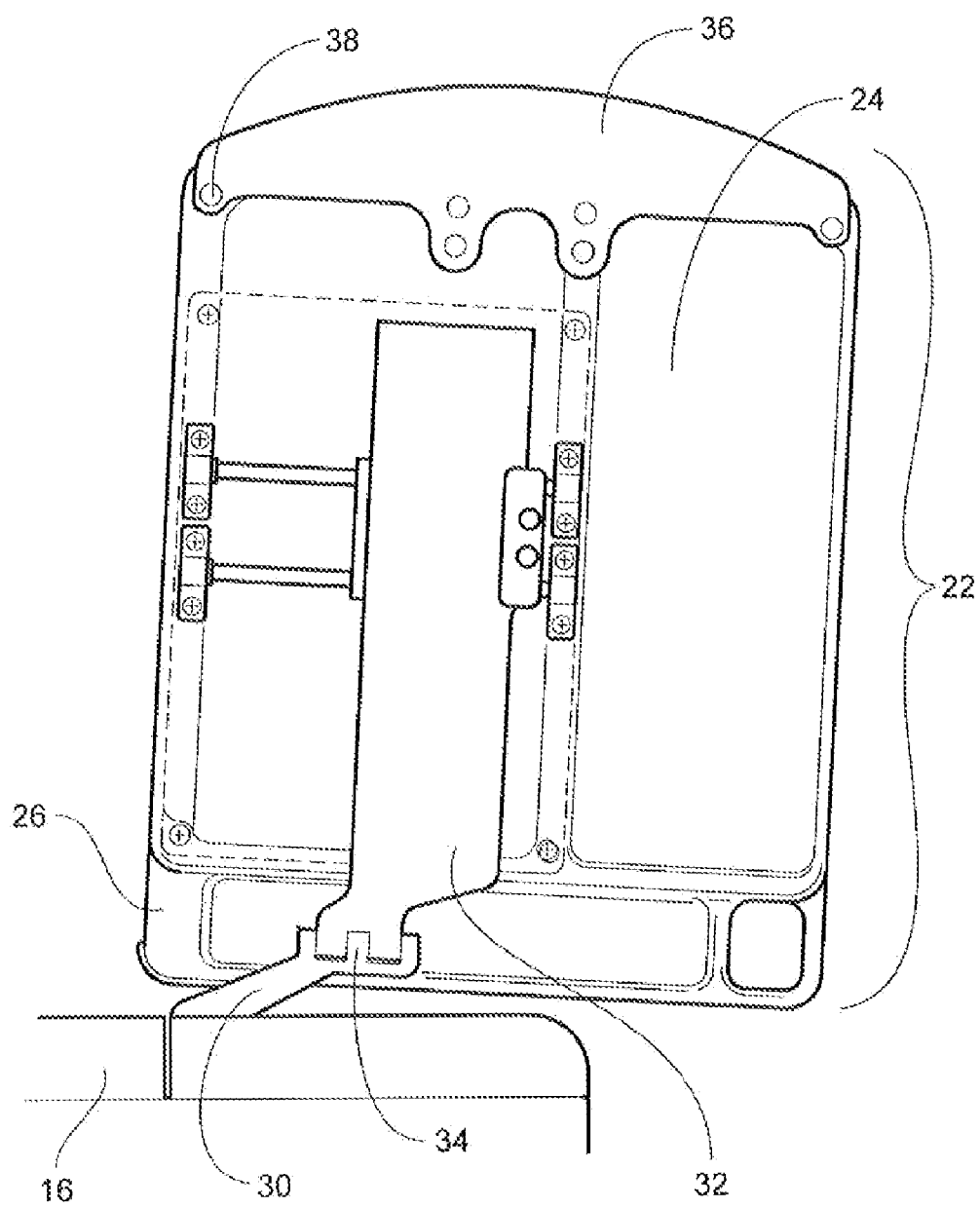
FIG. 2 is a bottom view of the tray table shown in the folded configuration.

Referring to FIG. 2, the tray table assembly 22 is shown rotated out of the end-bay of the armrest 16 and positioned vertical. Thus, the tray table assembly 22 is shown in a partially deployed configuration with the second tray table portion 26 folded flat against the first tray table portion 24. The tray table assembly 22 is attached to the seat through an attachment arm 30 that is rotatably connected to the seat and allows the tray table assembly to be selectively rotated between a stowed configuration and a withdrawn configuration. The attachment arm 30 is connected to a tray table support arm 32 through a hinge 34 that allows the tray table to be folded flat across the seat once rotated to the vertical position.

The tray table assembly 22 further includes a mechanical stop 36 positioned about one end of the first tray portion 24 for limiting the rotation of the second tray portion 26 relative to the first tray portion 24. Rotation is preferably limited to about 180 degrees so that the two tray portions together provide a generally planar working surface. In one embodiment, the mechanical stop 36 includes a polyethylene member attached to the first tray portion 24 that extends beyond the first tray portion and defines a flat surface for seating the bottom side of the second tray portion 26. The mechanical stop 36 may have various shapes, sizes and designs while performing the intended function and may be integral or attached using any suitable fastener 38 known in the art. The mechanical stop 36 may be attached to either tray portion or may be integrated into the hinge 44.

Figure 3:
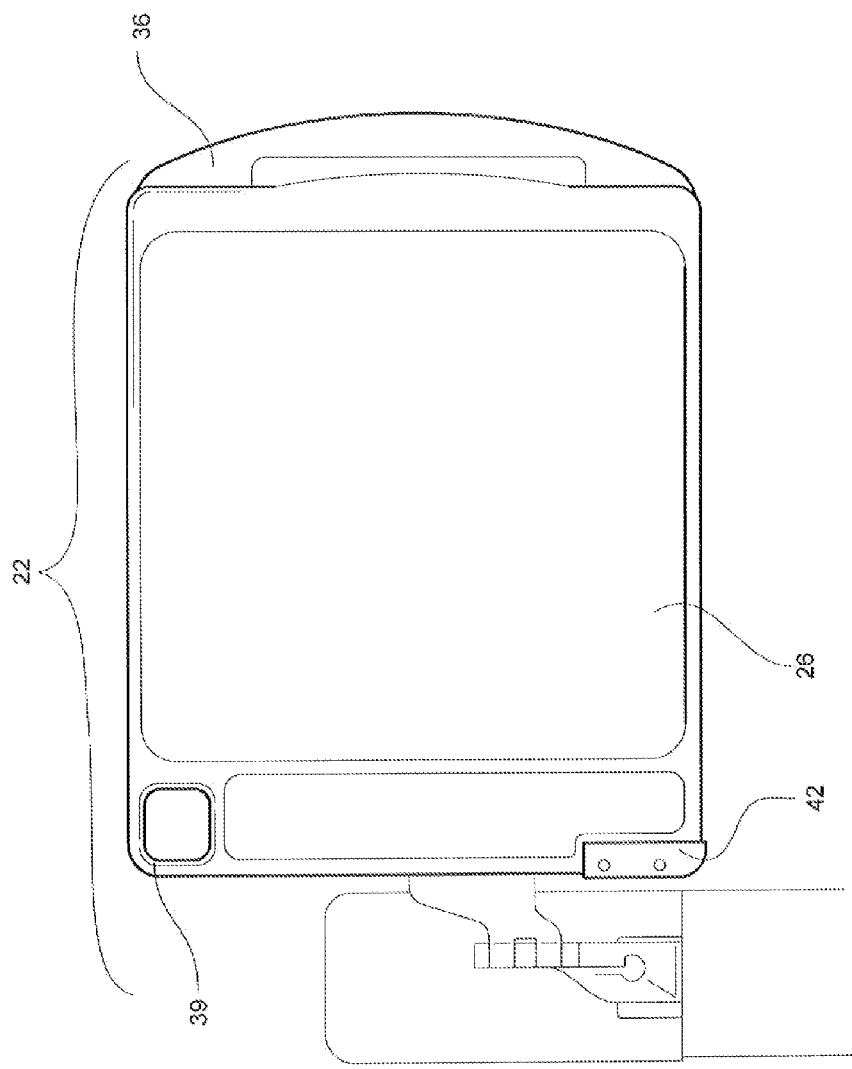
FIG. 3 is a top view of the tray table shown in the folded configuration.
Figure 4:
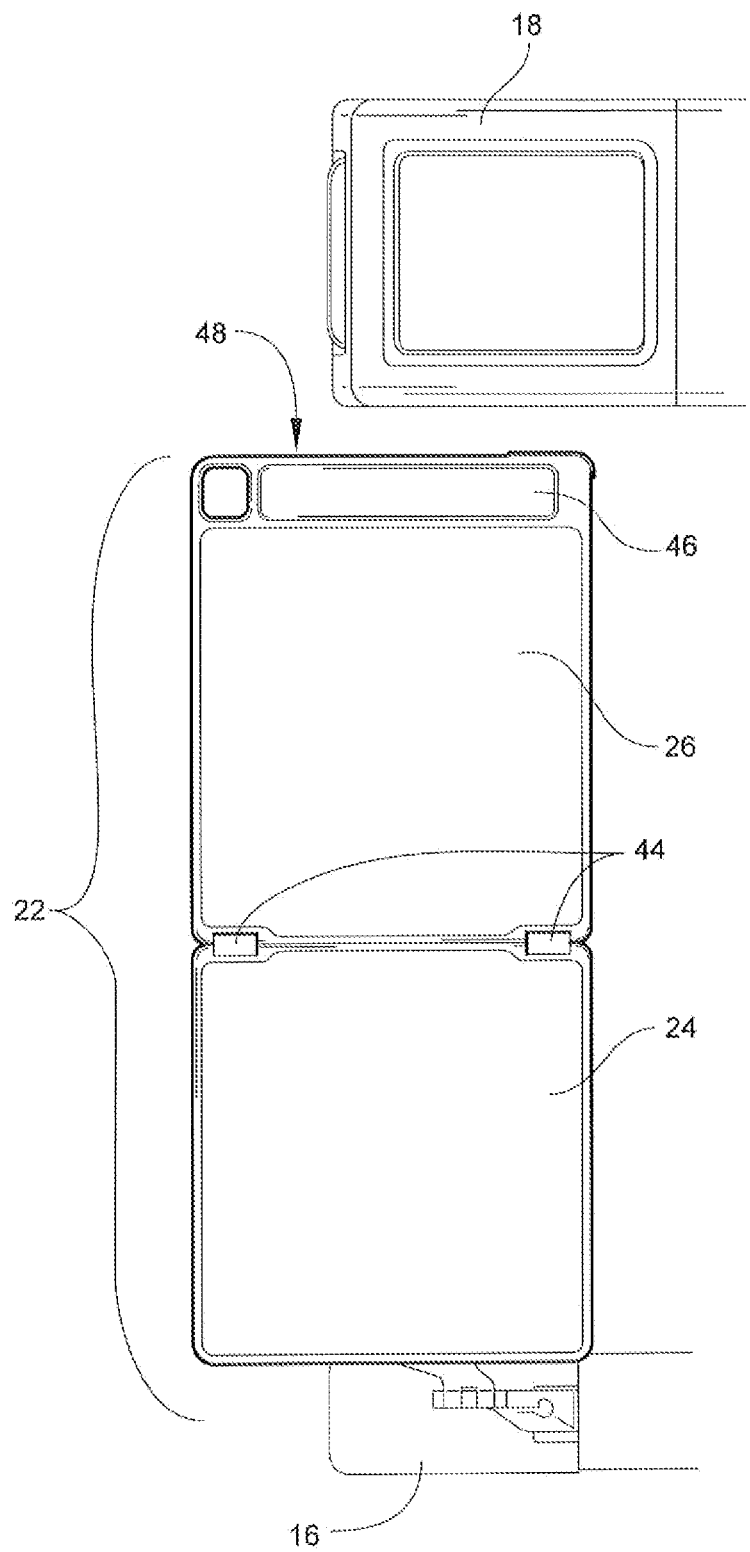
FIG. 4 is a top view of the tray table shown in the unfolded configuration and not laterally extended.

Referring to FIG. 3, the tray table assembly 22 is shown withdrawn from the armrest 16 and folded flat. The second tray table portion 26 is shown folded against the first tray table portion 24. A portion of the mechanical stop 36 is visible beyond the second tray table portion 26. The second tray table portion 26 defines a handling feature 39 for handling the tray. A cushioning element 42 is affixed to the bottom surface of tray portion 26 for cushioning the engagement with the armrest to minimize vibration. Referring to FIG. 4, the tray table assembly 22 is shown in the unfolded configuration and folded flat. The first and second tray table portions 24 and 26 are hinged together through at least one hinge 44. The hinge 44 allows the tray table assembly 22 to be rotated between a vertical position (i.e., partially installed) and a horizontal position (i.e., in use position). The second tray table portion 26 defines a recess 46 in its top surface for holding a utensil, writing instrument or other item. As shown, the tray table assembly 22 is in the in use configuration but is not extended to bridge the gap between the armrests 16 and 18. In other words, the tray table assembly 22 is not supported about end 48.

Figure 5:
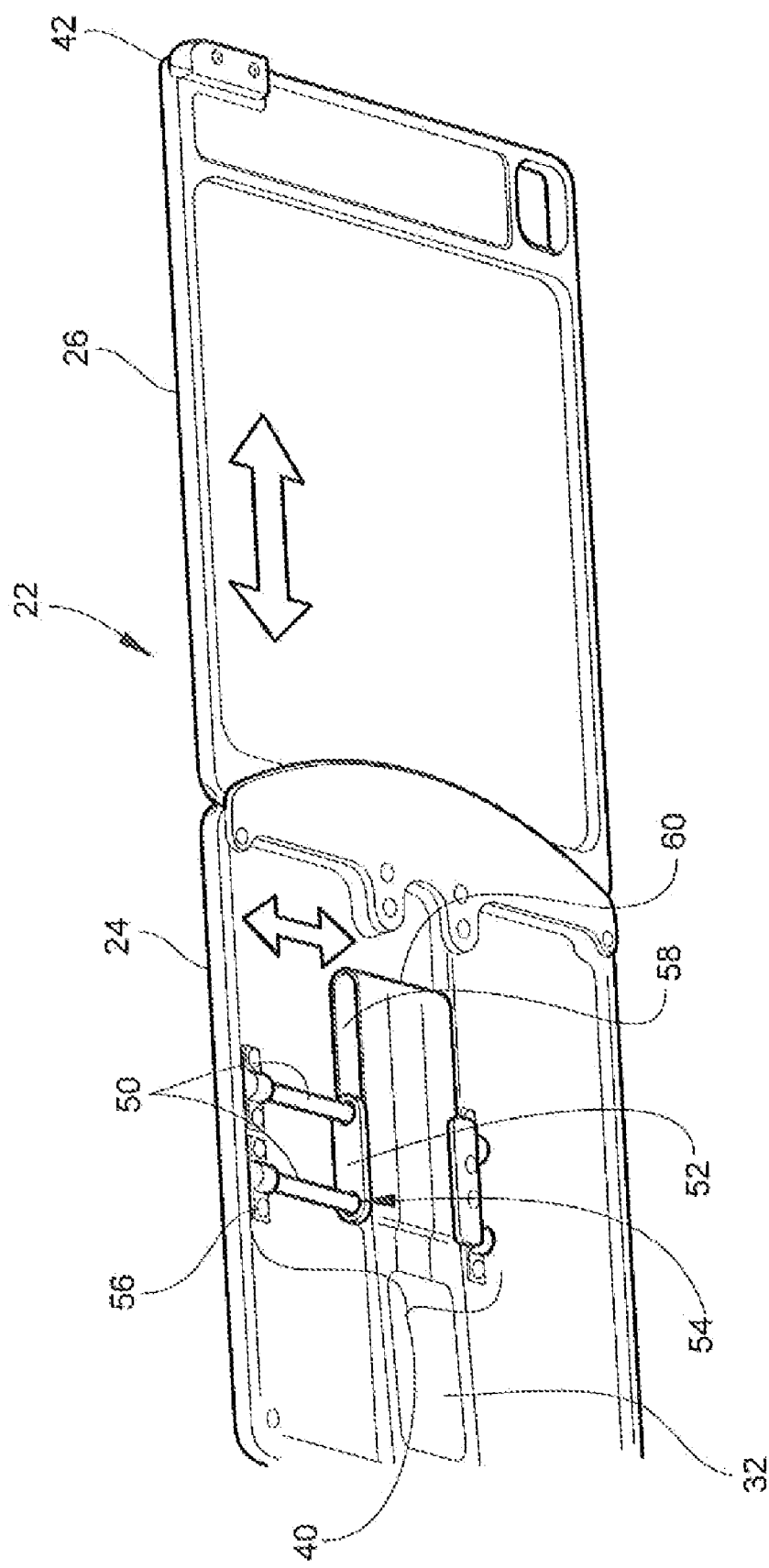
FIG. 5 is a bottom view of the tray table detailing the adjustment assembly.

Referring to FIG. 5, the tray table assembly 22 further includes an adjustment assembly 40 for selectively adjusting the tray table in the fore/aft and lateral directions. The adjustment assembly includes at least one guide 50 attached to the first tray table 24 along which a guide bracket 52 slides to provide fore and aft movement of the tray table relative to the fixed tray table support arm 32. The support arm 32 is "fixed" in that it does not move once folded flat into the "in use" position. As shown, the guide bracket 52 includes a pair of spaced apart openings 54 that receive the pair of guides 50. As shown, the guides 50 are rods that are fastened to the first tray portion 24 using any suitable bracket 56 and fasteners. The relationship of the guide 50 and the bracket 52 allows for limited fore and aft travel of the tray table relative to the support arm 32 while preventing twisting of the tray table. While a specific adjustment assembly is shown for fore and aft movement, it is envisioned that alternative structures may accomplish the same purpose without departing from the scope of the present invention.

The guide bracket 52 is slidably received within an elongate opening 58 defined within end 60 of the support arm 32. The length of the elongate opening 58 ranges from about 1 to about 12 inches in length, more preferably around 6 inches length. This length provides for about 1 to about 12 inches of travel for the tray table in the lateral directions. The guide bracket 52 and tray table portions 24 and 26 more laterally or "cross-craft" with respect to the fixed support arm 32. Referring to FIG. 6, in a preferred embodiment, the tray table assembly includes a sufficient amount of travel to bridge the gap w between armrests of the seat in order to support the tray table at both ends and eliminate or substantially reduce any "diving board effect." The tray table is supported at the first end by the tray table support arm 32 through the adjustment assembly 40, and at the second end by the seat armrest 18. Thus, the amount of lateral travel needed may depend upon the distance between seat armrests. The combination of unfolding the tray table portion 26 and the lateral sliding of tray table portions 24 and 26 together provide the extension distance required. At least one of the tray portions 24 and 26 may include indicia 62 instructing the seat occupant on how to adjust the tray. In one example, the tray may be simply moved by hand with minimal effort The foregoing is a description of various embodiments of an adjustable, bi-fold tray table that are given here by way of example only. Although the invention has been described with reference to preferred embodiments thereof, other embodiments may perform similar functions and/or achieve similar results. Any and all such equivalent embodiments and examples are within the spirit and scope of the present invention and are intended to be covered by the appended claims.

What is claimed is:

1. A tray table assembly, comprising:
   first and second tray table portions interconnected through at least one hinge for permitting rotation of the second tray table portion relative to the first tray table portion;
   an adjustment assembly for selectively adjusting the interconnected first and second tray table portions in at least one of fore/aft and lateral directions relative to a tray table support arm;
   a tray table support arm defining an elongated opening for slidably receiving the adjustment assembly; and
   an attachment arm connected to the tray table support arm for attaching the tray table assembly to a vehicle seat structure; and
   wherein the adjustment assembly comprises a guide bracket slidably received within the elongated opening to provide tray table adjustment in the lateral direction, and at least one guide attached to the first tray table portion along which the guide bracket moves to provide tray table adjustment in the fore/aft direction.

2. The tray table assembly according to claim 1, wherein the second tray table portion defines a handling grip for handling the second tray table portion.

3. The tray table assembly according to claim 1, wherein the at least one guide includes a pair of guide rods that are slidably received within a pair of guide openings defined by the guide bracket.

4. The tray table assembly according to claim 1, further comprising a mechanical stop attached to one of the first and second tray table portions for limiting the rotation of the second tray table portion with respect to the first tray table portion.

5. The tray table assembly according to claim 4, wherein the rotation is limited to about 180 degrees to provide a generally planar working surface.

6. The tray table assembly according to claim 1, wherein the tray table assembly is moveable between a stored configuration within an end bay of a seat armrest and a usable configuration folded flat across the seat.

7. The tray table assembly according to claim 1, wherein the tray table assembly bridges a gap defined between armrests of its associated a seat when the tray table assembly is in an unfolded and laterally extended configuration.

8. An adjustable tray table assembly for a vehicle seat, comprising:
   a bi-fold tray table;
   an adjustment assembly for adjusting the bi-fold tray table in the fore/aft and lateral directions relative to the vehicle seat;
   a support arm for supporting the bi-fold tray table and slidably receiving the adjustment assembly; and an attachment arm interconnected with the support arm for attaching the tray table assembly to the vehicle seat; and wherein the adjustment assembly comprises a guide bracket that is slidably received within an elongate opening defined by the support arm to provide adjustment of the bi-fold tray table in the lateral direction, and at least one guide attached to the bi-fold tray table along which the guide bracket moves to provide bi-fold tray table adjustment in the fore/aft direction.

9. A vehicle seat, comprising:

first and second armrests positioned apart and defining a gap therebetween; and a tray table assembly attached to the vehicle seat, the tray table assembly comprising:

first and second tray table portions interconnected through at least one hinge for permitting rotation of the second tray table portion relative to the first tray table portion;

an adjustment assembly for selectively adjusting the interconnected first and second tray table portions in at least one of fore/aft and lateral directions relative to a tray table support arm;

a tray table support arm defining an elongated opening for slidably receiving the adjustment assembly; and an attachment arm connected to the tray table support arm for attaching the tray table assembly to a vehicle seat structure; and wherein the adjustment assembly comprises a guide bracket slidably received within the elongated opening to provide tray table adjustment in the lateral direction, and at least one guide attached to the first tray table portion along which the guide bracket moves to provide tray table adjustment in the fore/aft direction.

10. The vehicle seat according to claim 9, wherein the second tray table portion is supported by one of the first and second armrests when in an unfolded and laterally extended configuration.

11. The vehicle seat according to claim 9, wherein the at least one guide includes a pair of guide rods that are slidably received within a pair of guide openings defined by the guide bracket.

12. The vehicle seat according to claim 9, wherein the tray table assembly further comprising a mechanical stop attached to one of the first and second tray table portions for limiting the rotation of the second tray table portion relative to the first tray table portion.

13. The vehicle seat according to claim 12, wherein the rotation is limited to about 180 degrees to provide a generally planar working surface.

14. The vehicle seat according to claim 9, wherein at least one of the first and second armrests defines an end bay for storing the tray table assembly between uses.

15. The vehicle seat according to claim 9, wherein the tray table assembly bridges the gap between the first and second armrests when the tray table assembly is in an unfolded and laterally extended configuration.

* * * * *